United States Patent [19] [11] Patent Number: 4,974,646
Martin et al. [45] Date of Patent: Dec. 4, 1990

[54] POWDER FLOW CONTROL VALVE

[75] Inventors: David Martin, Harwich; Roderick MacDonald, Little Oakley, both of United Kingdom

[73] Assignee: Portals Engineering Limited, Essex, United Kingdom

[21] Appl. No.: 274,924

[22] Filed: Nov. 23, 1988

[30] Foreign Application Priority Data

Nov. 23, 1987 [GB] United Kingdom ............... 8727425

[51] Int. Cl.⁵ ................. B65D 88/72; B65G 53/50
[52] U.S. Cl. ................................. 141/67; 141/46;
141/83; 141/128; 177/105; 177/116; 177/122;
222/77; 222/56; 222/544; 406/23; 406/84;
406/181
[58] Field of Search ............ 141/83, 46, 67, 128;
137/13; 222/77, 56, 152, 544, 564; 406/23, 24,
25, 83, 84, 181, 192; 177/89, 105, 116, 122,
119–120

[56] References Cited

U.S. PATENT DOCUMENTS

| 3,506,111 | 4/1970 | Eppenberger | 406/24 |
| 3,586,069 | 6/1971 | Vest | 141/128 X |
| 3,693,672 | 9/1972 | Hiland | 141/7 |
| 3,716,082 | 2/1973 | Green | 141/83 X |
| 3,797,890 | 3/1974 | Walters | 141/83 X |
| 3,858,628 | 1/1975 | Bendle | 141/46 |
| 3,884,401 | 5/1975 | Winkler | 406/192 |
| 4,212,331 | 7/1980 | Benatar | 141/67 |
| 4,573,504 | 3/1986 | Rosenstrom | 141/59 |
| 4,614,213 | 9/1986 | Englin | 141/83 |
| 4,688,610 | 8/1987 | Campbell | 141/83 |
| 4,735,241 | 4/1988 | Spiess | 141/83 X |

FOREIGN PATENT DOCUMENTS

| 0107626 | 5/1984 | European Pat. Off. . |
| 0125585 | 11/1984 | European Pat. Off. . |
| 0224621 | 6/1987 | European Pat. Off. . |
| 2158813 | 11/1985 | United Kingdom . |

Primary Examiner—Ernest G. Cusick
Attorney, Agent, or Firm—Beveridge, DeGrandi & Weilacher

[57] ABSTRACT

The disclosure relates to a powder flow control valve comprising a nozzle formed from a material such as high density polythene having an upper frusto-conical section which converges towards the lower end of the nozzle and terminates in a cylindrical section. The nozzle is encircled by a plenum chamber to which sources of vacuum and air pressure are selectively connectable through a pneumatic control system. When vacuum is connected to the plenum chamber, the resulting pressure drop across the wall of the porous nozzle causes powder flowing through the nozzle to consolidate in the nozzle and terminate the flow. When air pressure is applied to the plenum chamber, the resulting pressure rise across the boundary surface accelerates powder flow through the nozzle. The control means is arranged to establish air pressure in the plenum chamber to initiate opening of the valve and flow through the valve and, after a pre-determined time, to terminate the air pressure supply and allow powder to flow under gravity through the nozzle before flow is terminated when a pre-determined quantity of powder has been delivered by the nozzle by applying vacuum to the plenum chamber.

11 Claims, 7 Drawing Sheets

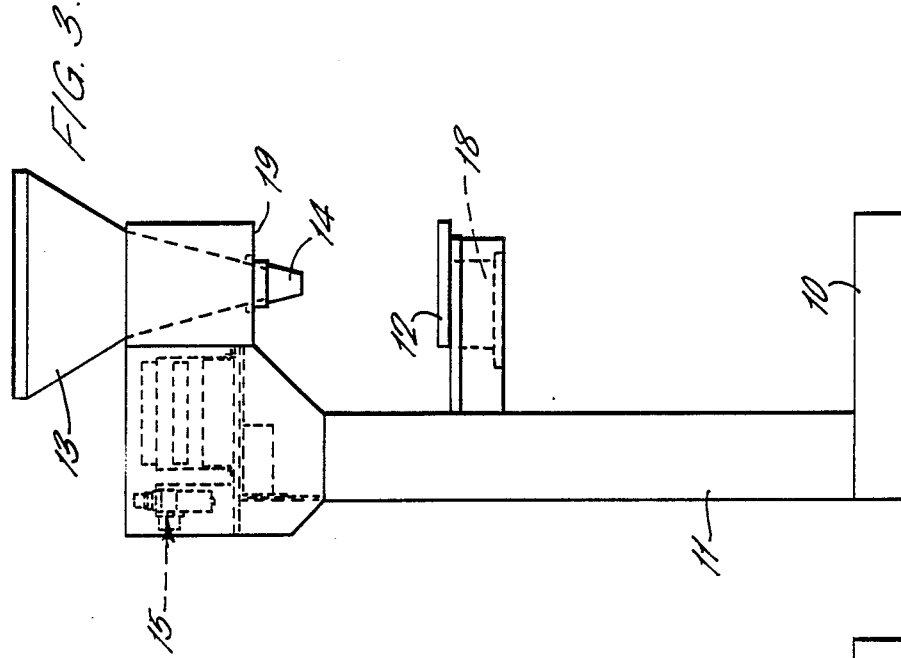
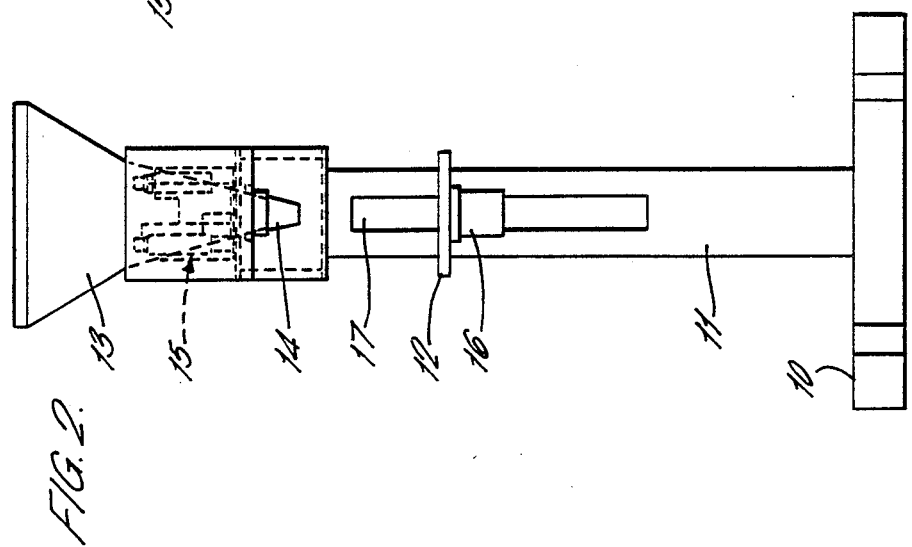

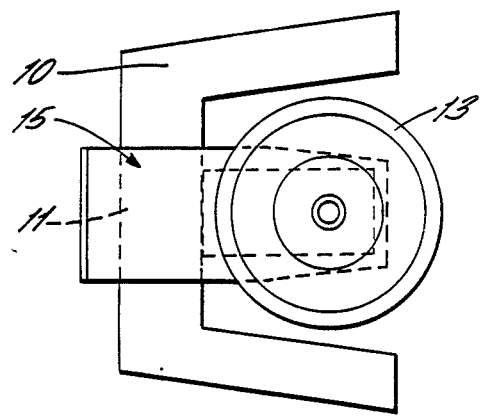
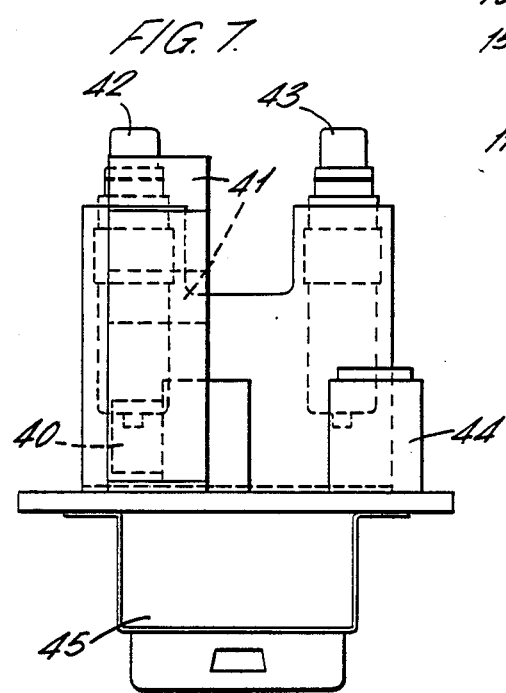
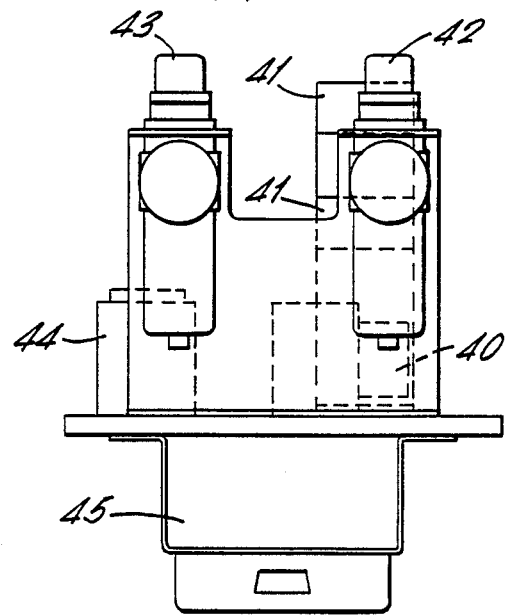

POWDER FLOW CONTROL VALVE

BACKGROUND OF THE INVENTION

1. Field of the Invention

This invention relates to a powder flow control valve and to a dispensing apparatus for powders incorporating such control valves. The term "powders" is intended to include fine powder material and also coarser material including granular material which is free flowing.

2. Background Prior Art

When a container is to be filled with the powder, it is usually desirable to measure the weight of powder very accurately and neither under fill nor over fill the container. For example, in the food industry, food products are sold in containers containing a measured weight of the powder. It is highly desirable that the measurement of the weight should be as accurate as possible since a minimum quantity of powder must be provided in the container whilst at the same time the supplier will wish to avoid over filling the container since that would amount to giving the product away for nothing.

U.K. Patent Publication No. 2158813B discloses a powder flow control valve in which a powder flow path is surrounded by a perforated boundary surface which converges in the direction of flow along the path. Means are provided for creating a drop in pressure across the boundary surface with the higher pressure on the powder flow path side of the boundary surface to stop flow of the powder along the path and further means are provided for creating pressure rise across the boundary surface with the lower pressure on the powder flow side of the boundary surface to promote the flow of powder along the path. The valve provides a highly responsive way of controlling the flow of powder but in some cases cut off cannot be determine sufficiently accurately to avoid over filling of the container.

SUMMARY OF THE INVENTION

The invention provides a powder flow control valve in which a downwardly extending powder flow path is surrounded by a perforated boundary surface converging, parallel and/or diverging in the downward direction of flow along the path and in which means are provided for creating a pressure drop across the boundary surface with the higher pressure on the powder flow path side of the boundary surface to terminate flow of said powder along the path, second means for creating a pressure rise across the boundary surface with the lower pressure on the powder flow both side of the surface to promote flow of powder along the path and control means for said first and second means for activating the second means to promote powder flow through the valve, deactivating the second means and, after a predetermined period during which powder flows under gravity through the valve, activating the first means to terminate flow through the valve.

By deactivating the further, pressure increasing means, and allowing the filling operation to be completed with the powder flowing under gravity through the valve, it is possible to obtain a much more accurate cut off in the flow of powder through the valve and therefore the risk of under or over filling the container is reduced.

BRIEF DESCRIPTION OF THE DRAWINGS

FIG. 2 is a front view of the device;

FIG. 3 is a side view of the device;

FIG. 4 is a plan view of the device;

FIG. 7 is a rear view of the pneumatic control system;

FIG. 8 is a front view of the pneumatic control system;

DESCRIPTION OF THE PREFERRED EMBODIMENTS

Figure 1:
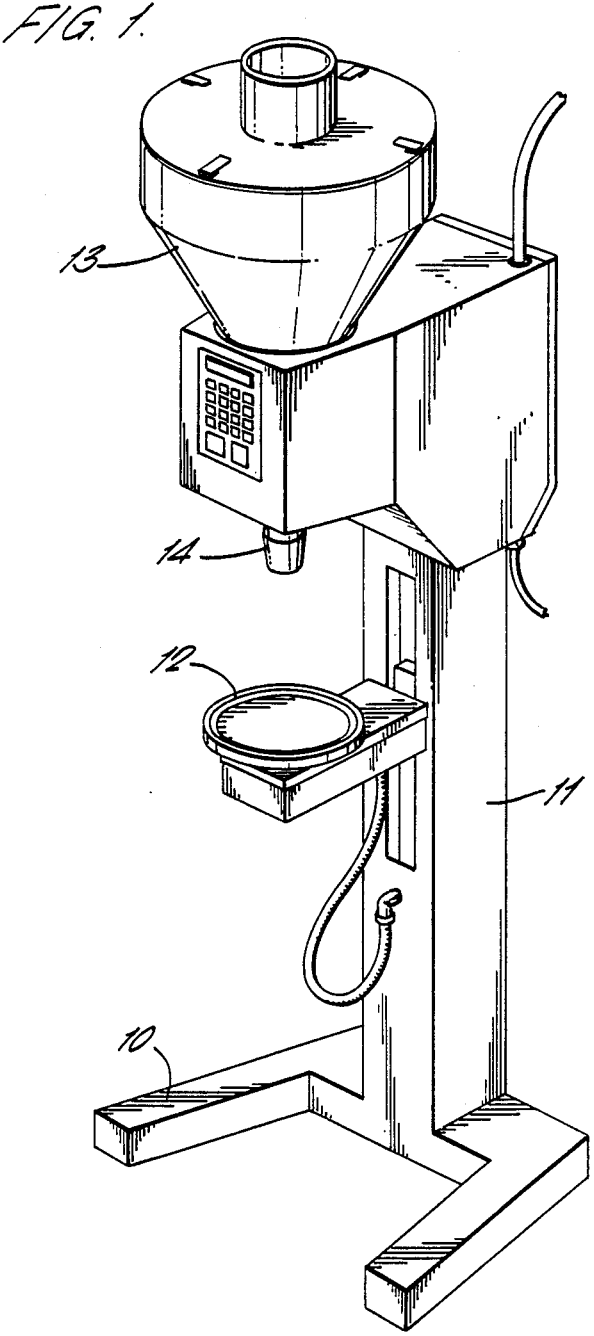
FIG. 1 is a perspective view of a powder dispensing device including a hopper having an outlet valve controlled by a pneumatic system.

Referring firstly to FIGS. 1 to 4 of the drawings, there is shown a device for filling containers with a predetermined weight of powder material comprising a base 10, an upright pillar 11, a platform 12 mounted part way up the pillar 11 to receive containers one by one to be filled, a hopper 13 mounted at the upper end of the pillar holding a supply of powder to be dispensed by a pneumatically operated control valve 14 for controlling flow of powder from the outlet of the hopper and a pneumatic system 15 for controlling operation of the valve.

The platform 12 is mounted on a cantilever arm 16 extending outwardly from a double acting pneumatic ram 17 mounted within the pillar 11. The arm 16 is connected directly through the side of the ram piston through an appropriate sealing arrangement to provide vertical adjustment of the arm 16 and thereby the platform 12 under the control of air pressure supplied to opposite ends of the cylinder of the ram. The height of the platform can thereby be adjusted to cater for different size containers to be filled. The platform 12 incorporates a weighcell assembly indicated at 18 to respond to the quantity of powder deposited in the container on the platform and to control the dispensing of the powder from the hopper as described later.

Figure 5:
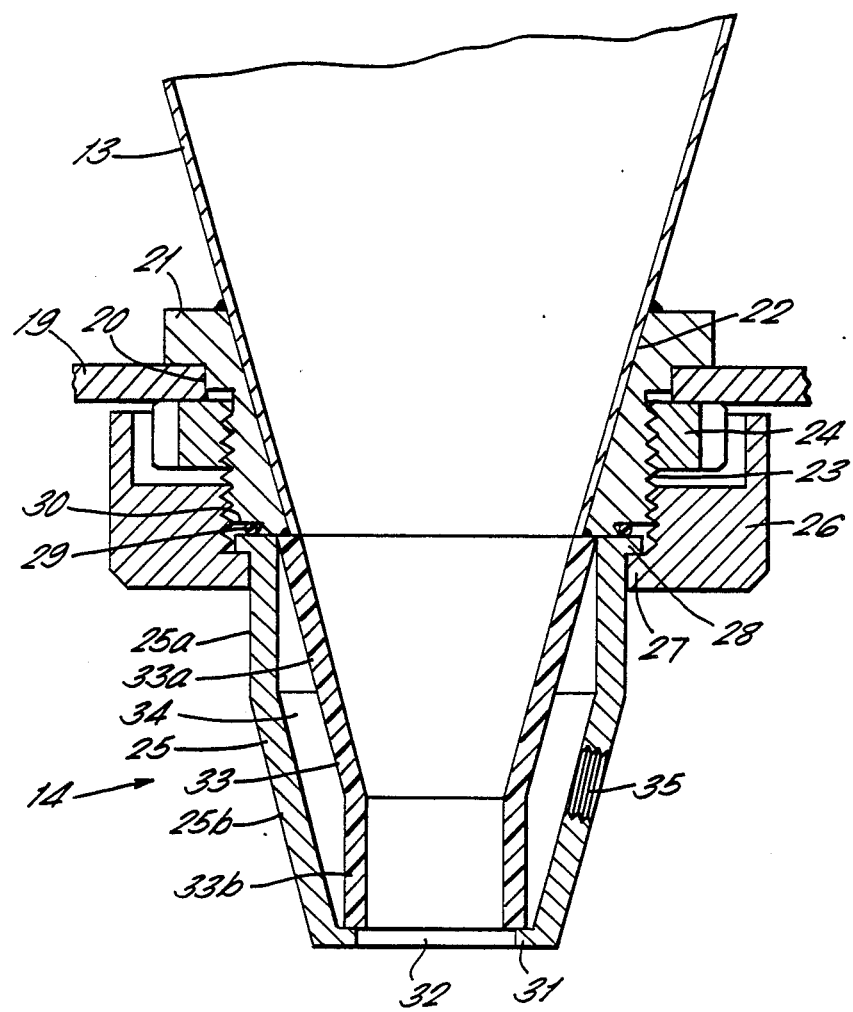
FIG. 5 is a detailed view of the pneumatically operated control valve at the base of the hopper.
Figure 6:
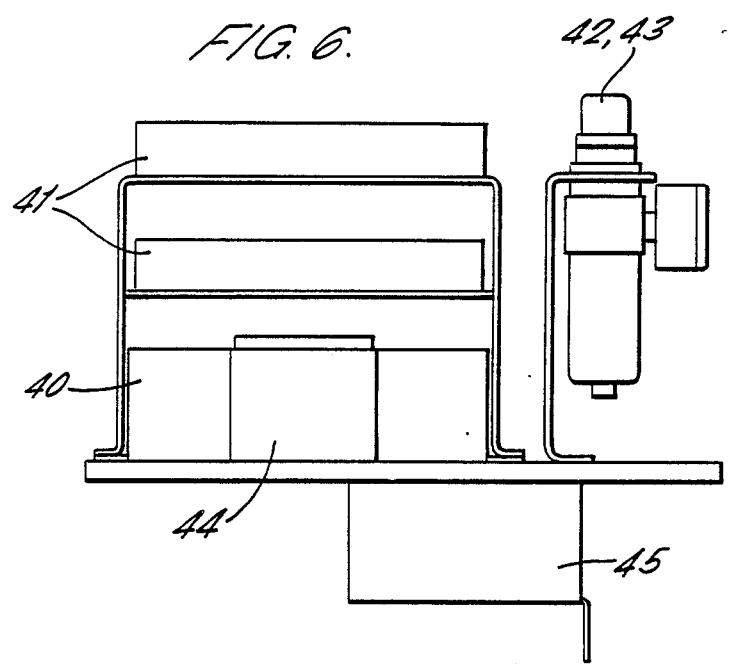
FIG. 6 is a side view of the pneumatic control system for the valve.
Figure 9:
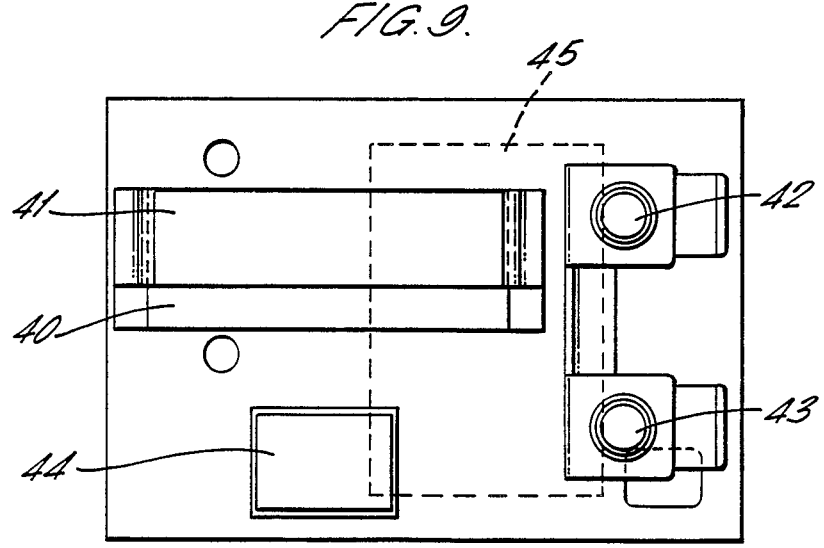
FIG. 9 is a plan view of the pneumatic control system.

Reference will now be made to FIG. 5 of the drawings which shows the construction of the pneumatically operated control valve in detail. At the head of the pillar 11 there is a horizontally extending support plate 19 having an opening 20 in which sleeve 21 is mounted. The sleeve has a frustoconical bore 22 to receive the lower end part of the hopper 13 which is welded to the sleeve at the upper and lower ends of the sleeve. The portion of the sleeve extending below the support plate 19 has an external screw thread 23 and an internally threaded collar 24 is screwed onto the sleeve to engage the underside of the support plate 19 and lock the sleeve in position in the plate. The downwardly extending generally tubular nozzle holder 25 is secured to the lower end of sleeve 21 by means of clamping ring 26 which also screws onto the threaded portion 23 of sleeve 21 and which has an annular shoulder 27 around its inner periphery which engages under an out-turned flange 28 around the upper periphery of nozzle holder 25. An "O" ring seal 29 is lodged in an annular recess 30 on the underside of the sleeve 21 to seal with the upper end face of the nozzle holder. The lower end of the nozzle holder has an internal flange 31 encircling an outlet aperture 32.

The nozzle holder contains a porous nozzle 33 formed from a material such as high density polyethylene or other porous material such as a ceramic or sintered metal or other plastics material. The nozzle includes a wall having an interior or first surface which encircles and defines the powder flow path. The nozzle has an upper frusto conical section 33a which converges towards the lower end of the nozzle and terminates in a plain cylindrical section 33b. The upper end of the nozzle engages around the outlet end of the hopper 13 and the lower end of the nozzle is lodged on the flange 31 encircling the lower end of the nozzle holder to hold the nozzle firmly in place.

The nozzle holder 25 has an upper generally cylindrical part 25a and a lower convergent part 25b to provide a plenum chamber 34 encircling the outer surface of the nozzle 33. A port 35 is formed in the lower part of the nozzle holder which is connected to a source of vacuum or air pressure through the pneumatic control system 14 which will be described in greater detail below.

In use, powder is supplied to the hopper 13 and falls into the nozzle 33. When air is being sucked out of the plenum chamber 34, air is drawn from the passage in the nozzle and this causes powder in the nozzle to adhere to the surface of the nozzle. A build up of powder occurs in the nozzle until the nozzle is effectively blocked closing off flow through the nozzle. Flow through the nozzle is established by supplying air under pressure to the plenum chamber 34 and this releases powder from the wall of the nozzle to allow the powder to flow through the outlet 32.

The air pressure accelerates the powder through the outlet to create a flow of the powder through the valve from the hopper to fill a container on the platform 12. The air pressure supply is switched off at a point in the filling cycle before the container is full and the powder is allowed to fall under gravity from the hopper to the container to complete the filling operation. The proportion of the filling cycle which is carried out with air pressure in relation to the proportion in which the powder falls under gravity is varied to suit the powder being dispensed, the accuracy of fill required and the required cycle time. Thus air pressure may be supplied to the plenum chamber to establish the flow of powder through the valve for a very short duration to establish flow through the valve and once that flow has been established, the air pressure is switched off and the remaining flow is allowed to take place under gravity alone. The other extreme, the air pressure is switched off just before the container is full leaving the remaining part of the filling operation to be carried out under gravity. The weighcell on the platform 12 monitors the filling operation and is arranged to trigger operation of the vacuum means to the plenum chamber 34 just before the container has been filled to the required extent so that the powder "in flight" between the valve and container will complete the filling operation.

Figure 12:
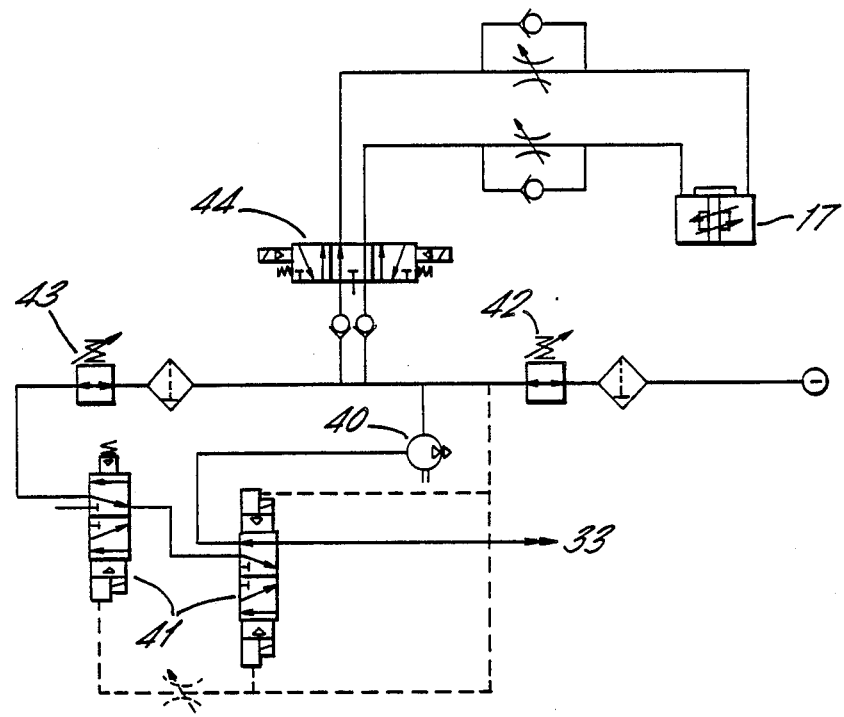
FIG. 12 is a diagrammatic illustration of a pneumatic control circuit for the device.

The pneumatic control system for the valve 14 referred to above will now be described briefly in relation to FIGS. 5 to 9 and 12 of the drawings. The control system comprises a vacuum pump 40, spool valves 41, filter regulators 42 and 43, the control valve 44 for the aforesaid ram 17 and a support plate 45 for the electronic control system. The pump provides a source of vacuum to the plenum chamber 34 and is controlled through spool valves 41. A suitable supply of positive pressure to the plenum chamber 34 is provided through and regulated by filter regulators 42 and 43 and controlled by spool valves 41 which lead to a conduit 46 connected to the nozzle 33. FIG. 12 is one typical layout of a pneumatic control system for the nozzle 33. The valves are controlled through the electronic control system by the weighcell as indicated above.

The apparatus can be used for dispensing a variety of powder or granular materials such as "Bournvita", coffee powder and semolina. It is not however restricted to food products and other powder or granular materials can be dispensed using the apparatus into containers as required.

The nozzle cone angle is varied according to the nature of the powder or granular material to be dispensed. An angle of 30° is effective for some materials, an angle of 15° for others. If it is found that the powder flow pulsates, a cylindrical lower section at the bottom of the cone as illustrated helps to smooth out the flow. Further variations on the cone/parallel format could include a cone-parallel-cone format or a double cone-parallel configuration.

The precise design of the porous nozzle utilised in the flow control valve can be varied considerably to suit the application. The angle of the frusto conical part of the nozzle may be varied according to the nature of the product and the length of the cylindrical part of the nozzle can be varied or the cylindrical part of the nozzle can be omitted altogether.

Figure 10:
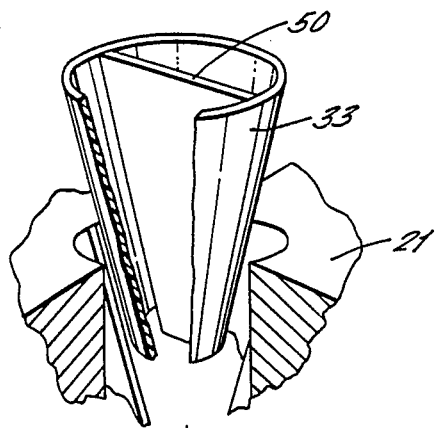
FIG. 10 is a diagrammatic view of a further form of control valve.

FIG. 10 shows a further arrangement in which the nozzle has a central dividing partition 50 and in this case the plenum chamber encircling the nozzle is divided into two sections corresponding to the parts of the nozzle on either side of the partition so that flow down either side of the partition can be individually controlled. This enables initial filling to take place through the whole nozzle and the flow to be halved towards the end of the filling operation by switching off flow through the part of the nozzle to one side of the partition by applying vacuum to the wall of the nozzle around that part leaving flow to continue through the other part of the nozzle to complete the filling operation at a reduced rate. Thus a "trickle" of powder can be supplied to the container at the end of the filling operation and cut off instantaneously to minimise over filling of the container. The nozzle could of course be further sub-divided by further partitions and the plenum chamber correspondingly divided to provide a graduated control of the flow.

Figure 11:
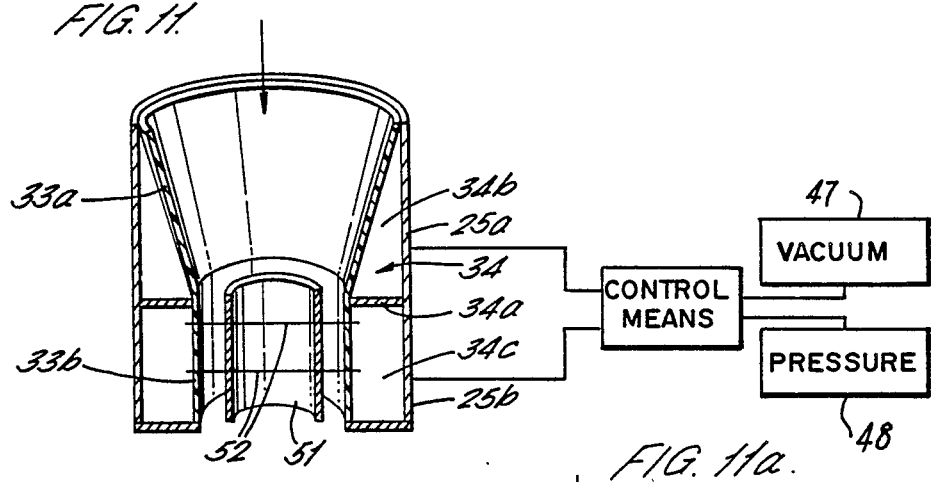
FIG. 11 is a diagrammatic view of a further form of control valve.
Figure 11A:
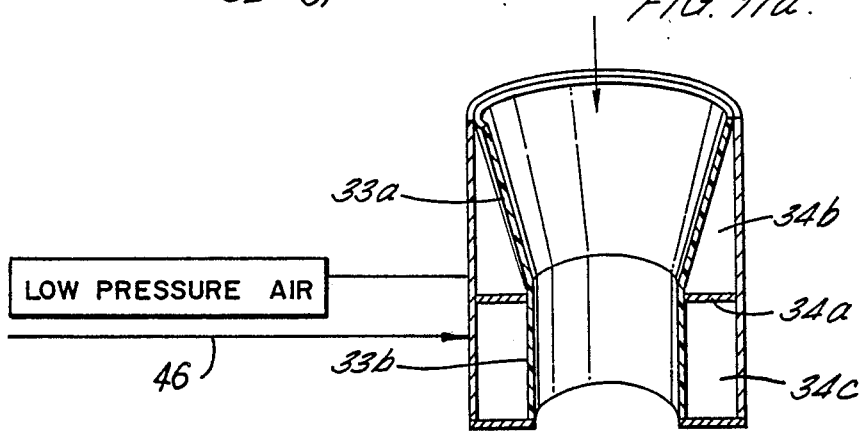
FIG. 11c shows a modified form of the control valve of FIG. 11.

A further arrangement is illustrated in FIG. 11 of the drawings in which the plenum chamber 34 is divided by a horizontal wall 34a into upper and lower sections corresponding to the frusto conical and cylindrical parts of the porous nozzle to enable the latter to be controlled individually. In addition a tubular element 51 is disposed concentrically within the cylindrical part 33b of the nozzle mounted on support pins indicated at 52. If air pressure is applied to both upper 34b and lower 34c parts of the plenum chamber 34 or neither part is connected to the vacuum, the powder will flow through the valve and both through the tube and between the tube and cylindrical part of the nozzle. If vacuum is applied to the lower part 34c of the plenum chamber, flow between the tube 51 and cylindrical part of the nozzle is terminated leaving only a restricted flow through the tube 51 itself to provide a slow rate of delivery immediately before terminating delivery. The latter is effected by applying suction to upper chamber 34b to terminate flow through the upper, frusto conical part of the cone. Flow is re-established, as before, by applying air pressure to the upper and lower parts of the plenum chamber 34. The nozzle of FIG. 11 may be modified as shown in FIG. 11a by omitting tubular element 51 and support pins 52. In such an arrangement application of vacuum from conduit 46 to section 34c is utilized to arrest product flow after completion of the filling operation and a low pressure compressed air can then be supplied to section 34b to percolate into the product hopper to prevent compaction of the powder and assist the initiation of product flow in the next filling operation.

A still further arrangement which is not illustrated could comprise twin nozzles differently sized for bulk fill and topping up arranged side-by-side one another. The larger, bulk fill nozzle would be closed just before the container was full leaving the smaller nozzle to complete the filing operation since there would be less material "in flight" when the smaller nozzle is finally closed, the risk of substantially over filling is minimised.

The filling apparatus described above is suitable for dispensing a wide variety of different forms of powders and granular materials or mixtures of such materials include powder soups containing granules of different foods, mueslies and other such materials.

We claim:

1. A powder flow control valve for dispensing a predetermined weight of powder in which a downwardly extending powder flow path is surrounded by a perforated boundary surface past which powder may flow under gravity, said perforated boundary surface having a first side which faces the powder flow path, the valve having first means for creating a pressure drop across the boundary surface with a higher pressure on the first side of the boundary surface to terminate flow of powder along the path and second means for creating a pressure rise across the boundary surface with a lower pressure on said first side of the surface to promote flow of powder past the surface;
    wherein the improvement comprises control means responsive to the quantity of powder delivered for selectively operating said first and second means in a sequence having a first period of time during which the first means is deactivated and the second means is activated to dispense powder with accelerated flow past the boundary surface, a second period of time during which the second means is deactivated and the first means is maintained deactivated to allow flow to continue past the boundary surface under gravity until a required quantity of powder has been dispensed by the valve as detected by the control means, and a third period of time during which the first means is activated by the control means to terminate flow of powder through the valve.

2. A valve as claimed in claim 1 wherein said control means includes means for determining when a predetermined quantity of the powder has been delivered by the valve and for activating the first means when that predetermined quantity has been reached.

3. A control valve as claimed in claim 2 wherein the control means includes means for determining the weight of a quantity of powder delivered by the valve to a container being filled and for initiating operation of the first means to terminate flow when the weight delivered equals the predetermined amount.

4. A control valve as claimed in claim 3 wherein a control system is provided for determining when the control valve has been opened for a predetermined period and for actuating the first means at the end of that period.

5. A control valve as claimed in claim 1, wherein the boundary surface is provided by a perforated wall encircling the powder flow path and having an outer surface on the opposite side of the wall to the powder flow path, said first means comprise suction means acting on said outer surface of the perforated wall to create said drop in pressure across the wall and the second means includes air pressure supply means for supplying air under pressure to said outer surface of the perforated wall to provide said pressure rise across the wall.

6. A control valve as claimed in claim 5 and further including a chamber in which the perforated wall is mounted with a closed cavity being formed between the perforated wall and said chamber, and said suction and air pressure supply means are connected to the chamber.

7. A control valve as claimed in claim 6, wherein the perforated wall comprises an upper frusto conical section terminating, at its lower end, in a cylindrical section.

8. A flow control valve as claimed in claim 7 wherein the angle of the frusto conical section is between 10 degrees and 60 degrees.

9. A powder flow control valve as claimed in claim 7, wherein the chamber is divided into separate upper and lower chambers encircling the frusto conical and cylindrical sections of the wall respectively each having air pressure and vacuum supplying means connected thereto respectively providing said second means and said first means, and a vertically extending inner tube is mounted concentrically within the cylindrical wall through which a restricted flow of powder may be allowed to flow, said control means being operable to supply suction to the outer surface of the cylindrical section but not to the frusto conical section to provide a restricted delivery of powder before finally terminating flow by applying suction to the outer surface of the frusto conical section.

10. A powder flow control valve as claimed in claim 7, wherein the chamber is divided into separate upper and lower chambers encircling the frusto-conical and cylindrical sections of the wall respectively, the control means being operable to connect the first and second means to the lower chamber, and the upper chamber having air pressure supplying means, and the control means is arranged to cause pressurized air at a reduced level to be applied to the upper chamber whilst said first means applies vacuum to the lower chamber so that when powder flow is prevented by the latter the powder held in the valve does not become compacted and flow can be reestablished readily once the vacuum to the lower chamber has been relieved.

11. A control valve as claimed in claim 5, wherein the path through the perforated boundary surface is divided by a partition extending across the path into two or more separate flow paths, the perforated boundary surface has been divided into two or more sections by the partition each of which has independent first means for creating a drop in pressure across the boundary surface and independent second means for creating a pressure rise across the boundary surface to enable flow in the respective paths formed by the partition to be controlled individually.

* * * * *